United States Patent [19]

Lee

[11] 3,918,597

[45] Nov. 11, 1975

[54] METHOD OF MOVING A HEAVY LOAD
[75] Inventor: William Smith Lee, New Orleans, La.
[73] Assignee: Lee Inventions, Inc., New Orleans, La.
[22] Filed: May 7, 1974
[21] Appl. No.: 467,781

Related U.S. Application Data
[60] Continuation-in-part of Ser. No. 189,337, Oct. 14, 1971, Pat. No. 3,809,261, which is a division of Ser. No. 9,223, Feb. 6, 1970, Pat. No. 3,633,774.

[52] U.S. Cl. .......... 214/152; 214/38 CC; 280/41 R
[51] Int. Cl.² ............... B65G 67/02; B62B 3/02
[58] Field of Search ............ 214/38 C, 38 CC, 152; 280/43, 43.24, 46, 41 R, 41 D, 39, 42; 254/8 R, 8 C, 131

[56] References Cited
UNITED STATES PATENTS

| 431,953 | 7/1890 | Pinckney | 280/41 R |
| 1,081,093 | 12/1913 | Chapman et al. | 280/46 |
| 2,932,527 | 4/1960 | Payne | 214/38 C X |
| 3,633,774 | 1/1972 | Lee | 214/38 CC X |

FOREIGN PATENTS OR APPLICATIONS 109,009   11/1943   Sweden ........................ 280/43.24

Primary Examiner—Robert G. Sheridan
Attorney, Agent, or Firm—C. Emmett Pugh

[57] ABSTRACT

A heavy duty moving system including a base sled having two sets of integral, drop-leaf, heavy duty caster wheels (Figure 1) and a lever arm assembly (Figure 6) for moving heavy equipment, for example, the "XEROX" copy machines of the 2400 series. The sled is slid under the machine (Figure 8) and then raised at one end by the lever arm assembly (Figure 9), after which one set of integral, drop-leaf caster wheels are lowered into position and locked. The opposite end of the sled is jacked up and the second set of integral, drop-leaf caster wheels are lowered and locked into position after which the lever arm assembly is removed. The machine then rests on the sled and its caster wheels and is ready for transportation. The machine is taken off the moving system in the opposite manner.

9 Claims, 13 Drawing Figures

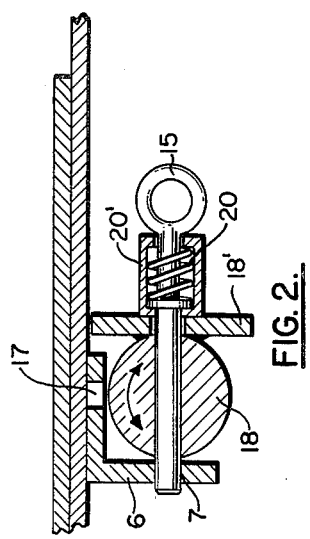
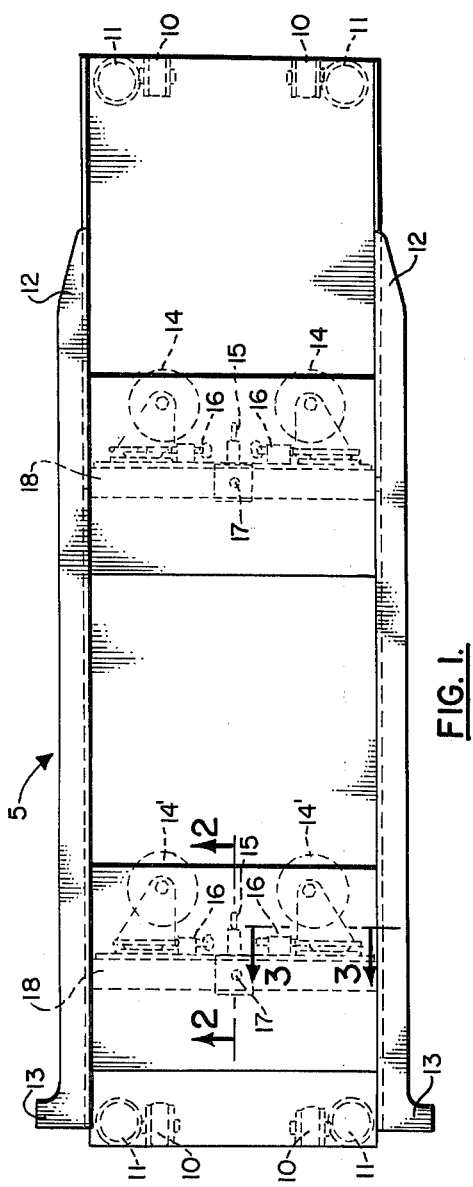
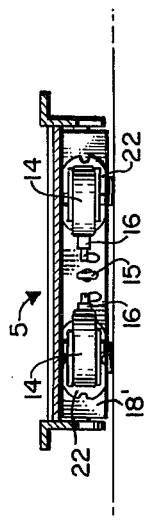
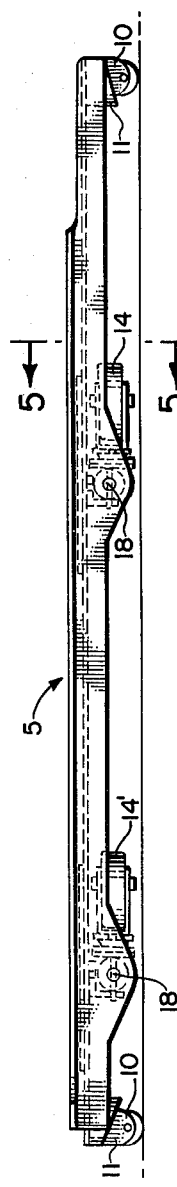
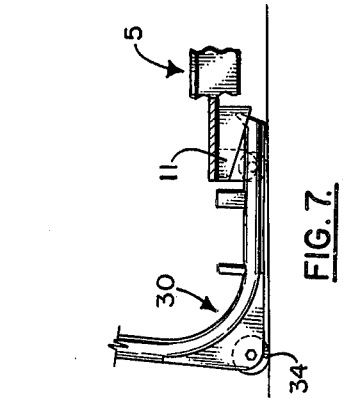
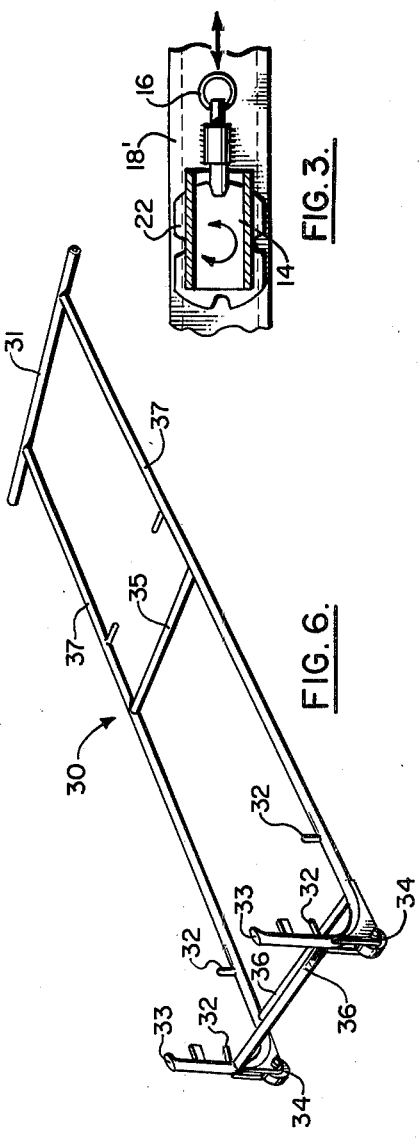

3,918,597

METHOD OF MOVING A HEAVY LOAD

CROSS-REFERENCE TO RELATED APPLICATIONS

This application is a continuation-in-part of the co-pending application Ser. No. 189,337, filed on Oct. 14, 1971, being issued as U.S. Pat. No. 3,809,261, on May 7, 1974, which is a division of Ser. No. 9,223, filed on Feb. 6, 1970, now U.S. Pat. No. 3,633,774, issued on Jan. 11, 1972.

BACKGROUND OF THE INVENTION

The present invention relates to a multi-element moving system for transporting heavy equipment. Heretofore, various systems have been devised for moving heavy equipment but all have been relatively complex, awkward, expensive, undependable, time consuming and/or difficult to use. It is a basic object of the present invention to overcome and solve these prior art problems in a simple, reliable and straight forward manner.

As an example of the prior art, the present system for moving the "XEROX" copy machines of the 2400 series from one place to another consists of a bolt-on "jury-rig" system comprising a set of several angle iron brackets with removable wheels and a separate hydraulic jack and requires the removal of the machine's skirts and convenience casters. Using this prior art system it would often take two men approximately an hour to prepare the machine for moving and about an equal amount of time to disengage the moving gear and replace the machine's parts upon completion of the move.

By contrast the system of the present invention reduces the time of preparation and disengagement to several minutes, can be performed by only one person and does not require the removal of the skirts or convenience casters or bolting or unbolting of any gear on the machine.

Additional advantages over the prior art include inter alia greater protection to the delicate underside of the machines and a superior lengthwise placement of moving casters which facilitates the moving of the machine over uneven surfaces and permits the handling of the machine with a fork lift. The present invention also facilitates the crating or uncrating of the machine with or without the assistance of a lift machine.

The moving system disclosed herein is similar in structure and approach to the moving system disclosed in my co-pending application Ser. No. 9,223 (U.S. Pat. No. 3,633,774) except that in the present invention the caster wheels are integrally a part of the base sled rather than structurally separate and apart as in my prior invention. In the former (the present invention) the integral caster wheels are folded in and out of position, while in the latter the separate caster wheels are slid in and out of lateral channels. However, both embodiments have base sled members which are engaged with the machine to be moved and which also act as a base part of the assemblage to be jacked up, and both utilize lever arm jacking means and caster means to facilitate the move. Other common features are taught and discussed and other references will be made thereto herein. However, for the sake of brevity, most of the common features will not be repeated here, and the entire disclosure of my prior application Ser. No. 9,223 (U.S. Pat. No. 3,633,774) is hereby bodily incorporated herein for the fullest understanding and appreciation of the present invention.

BRIEF DESCRIPTION OF THE DRAWINGS

FIG. 1 is a top elevational view of the base sled of the moving system of the present invention;

FIGS. 2 and 3 are fragmentary, cross-sectional views of the sled of FIG. 1 along section lines 2—2 and 3—3, respectively;

FIG. 4 is a side view of the sled of FIG. 1;

FIG. 5 is an end cross-sectional view of the sled of FIG. 1 along section lines 5—5;

FIGS. 6 and 7 are perspective and fragmentary side views of the lever arm assembly of the moving system of the present invention, the latter showing the lever arm assembly engaging the end of the base sled for the jacking up thereof;

DESCRIPTION OF PREFERRED EMBODIMENTS

Figure 8:
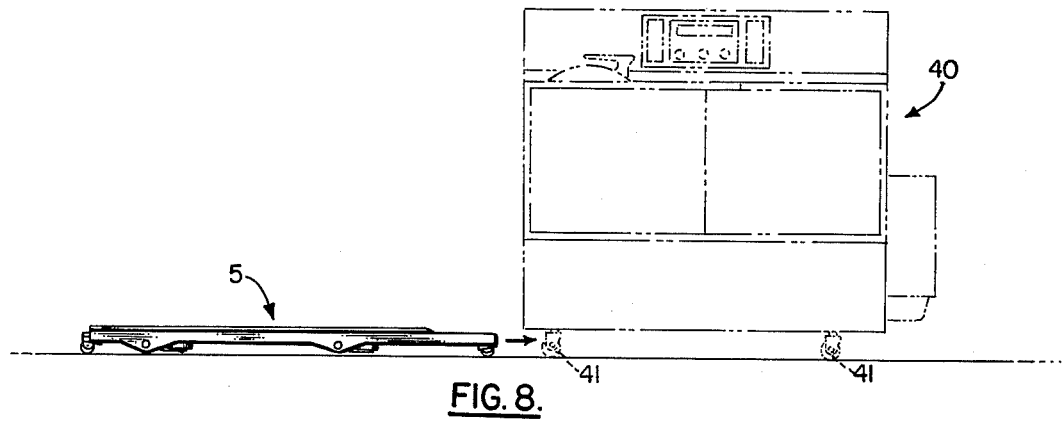
FIGS. 8–12 are side plan views showing the steps in mounting the machine utilizing the system of the present invention.

Generally speaking, the preferred embodiment of the moving system of the present invention herein comprises a lever arm assembly 30 (note FIG. 6) and a base sled 5 (note FIGS. 1, 4 and 5) having two integral sets of "drop-leaf" caster wheels 14, 14' mounted thereon.

Referring now particularly to FIGS. 1–5, a wheeled base sled 5 is shown having load-bearing flange members 12 being gently flared at the leading edge of the sled 5 for guiding the sled 5 into position on the underside of the machine to be moved. The rear edge of the flanged areas 12 have dog ears 13 for preventing the sled 5 from sliding past the rear convenience casters of the machine to be moved, thereby acting to position the sled in proper engagement with respect to the underside of the machine. The flanged areas 12 and the dog ears 13 also serve to lock the sled 5 and the machine together, as more fully described in my prior application.

Sled 5 has small casters 10 for facilitating the sliding movement of the sled 5 into position under the machine to be moved. At each edge of the sled 5 is a set of two, beveled lift sockets 11 into which the tips 33 of lever arm assembly 30 are inserted and engaged, as shown particularly in FIG. 7.

Except for the caster wheel assemblies, the base sled 5 of the present invention is substantially identical to the base sled 1 of my prior application Ser. No. 9,223 (U.S. Pat. No. 3,633,774), particularly as to the flared flange elements with dog ears, the small sled casters and the lift sockets and the operations and functions thereof. Because these features are fully described in my prior application, they will not be repetitiously described in detail here.

Figure 12:
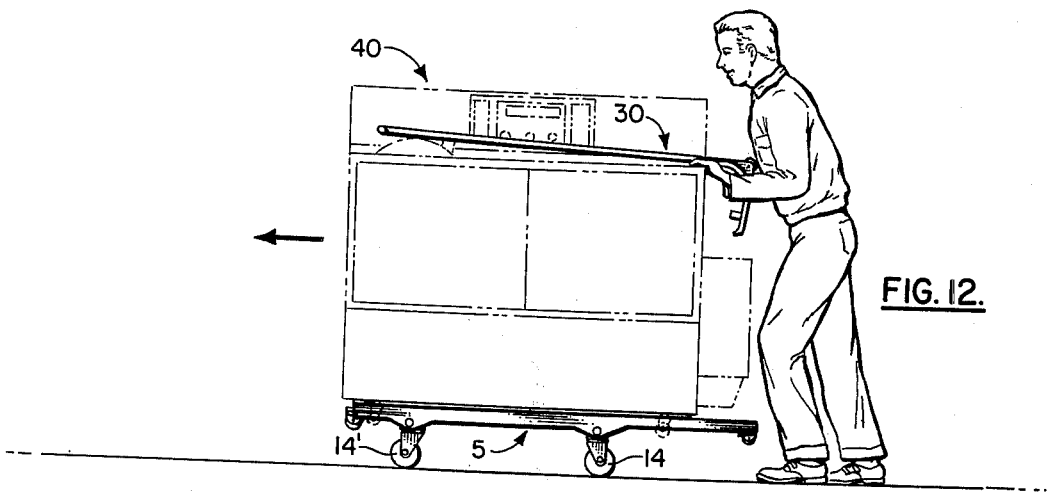

Two sets of drop-leaf caster sets 14 and 14' are positioned toward the leading and rear ends, respectively, of sled 5 but, as illustrated, are located inboard from the ends of the sled 5. Also, as can best be seen in FIG. 4, the caster wheels 14, 14' always lie below the upper load-bearing surface 12 of the sled 5. The casters 14 and 14' have two positions — a lowered, operative position (FIG. 12) and a raised, inoperative position (FIGS. 1, 4 and 5 and 8–a); wherein, in the latter, the radial plane of the caster wheels 14, 14' is parallel to the upper load-bearing surface 12 and, in the former, perpendicular thereto (compare e.g. caster wheels 14 in FIGS. 9 and 10).

Cylindrical member 18 has casters 14 and 14' fixedly attached to it and is rotatably mounted with respect to sled 5, thereby providing drop-leaf casters 14 and 14' with a horizontal, lateral axis of rotation between their lowered and raised position. Male locking ring bolt 15, face plate 18' and housing 20' are all fixedly mounted on the cylindrical rod 18 and rotate therewith, while locking bracket 6 is fixedly attached to the sled 5. (Note FIG. 2).

In the raised, inoperative position, male locking bolt 15 projects through a first female hole 7 in bracket 6, while a second female hole 17 (at a 90° angle from hole 7) acts to receive bolt 15 when drop-leaf casters 14 and 14' are in their lowered, operative position. Spring 20 in housing 20' biases bolt 15 inwardly toward the holes 7, 17, thereby locking the drop-leaf casters into either their lowered or raised position, as the case may be. To unlock the rotatable caster assembly 14-14'-15-1-8-18'-20', the ring bolt 15 is merely pulled out against the biasing force of the spring 20 and the entire assembly rotated to its desired position.

Drop-leaf casters 14 and 14' are also mounted on a three-hundred-and sixty degree swivel or turntable 22 which has notched areas at each 90° quadrant on the surface area of the turntable 22. Respective spring-operative bolt means 16 are positioned so as to be engageable with the notched areas on their respective turntables 22. This bolt-notch combination serves the dual purpose of providing a means to lock drop-leaf casters 14 and 14' into a fixed alignment with respect to the direction of movement of the moving system, as well as to lock the casters 14, 14' in a flat, horizontal disposition when in their raised, inoperative position. (Note particularly FIGS. 3 and 5.)

The lever arm assembly 30, as shown in FIGS. 6 and 7, is identical to the L-shaped lever arm assembly 3 shown and discussed in my prior application Ser. No. 9,223 (U.S. Pat. No. 3,633,774). The lever arm assembly 30 is comprised of, basically, two tubular parallel, extended L members 37 joined together by a top handle bar 31, a cross bar 35 at its mid-section and a lower cross bar 36 at its lower end. The lower, shorter legs of the L members 37 are bent over at an angle of slightly over 90° toward the upper or main section of the L members 37 and are provided with a set of tips or boots 33. The tips 33 mate with sockets 11 in a fashion shown in FIG. 7. Wheels 34 are provided at the bend in the L members 66 for ease in using and transporting the sled 5, while rack members 32 are used to support the sled 5 in the nested manner depicted in FIG. 13, which may represent the moving system before or after its use.

A typical operation using the moving system is shown in FIGS. 8-13 and discussed below. For purposes of illustration only, the moving system of the present invention is described as applied to the moving of a "XEROX" duplication machine of the 2400 series, but it is of course applicable to the moving of heavy equipment generally, particularly equipment which has a substantial portion of its bottom area offset from the surface on which it rests.

A "XEROX" 2400 series machine 40 is shown in FIG. 8 resting on its convenience casters 41. The casters 41 are relatively light weight and permit the machine to be moved only a short distance on a relatively smooth surface and therefore are unsuitable for long-haul moves over somewhat obstructed surfaces.

Figure 9:
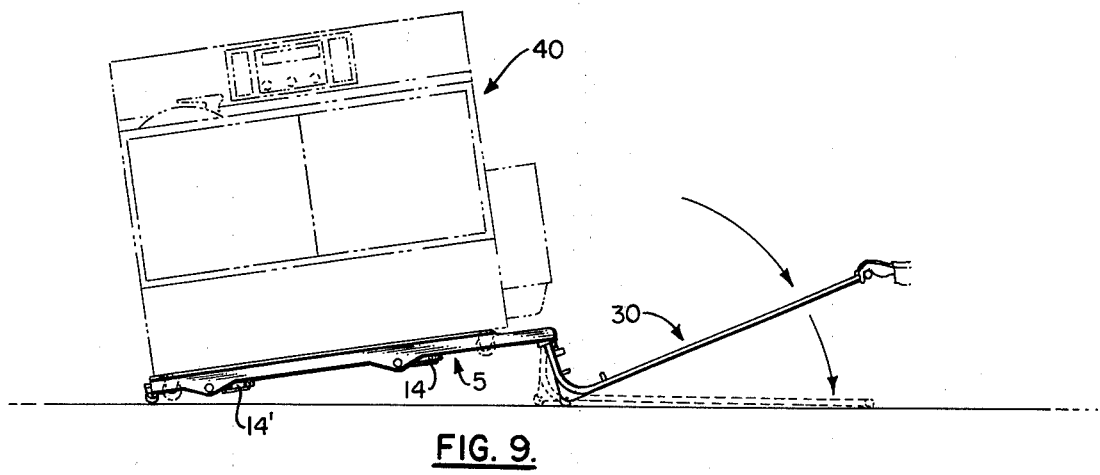
Figure 10:
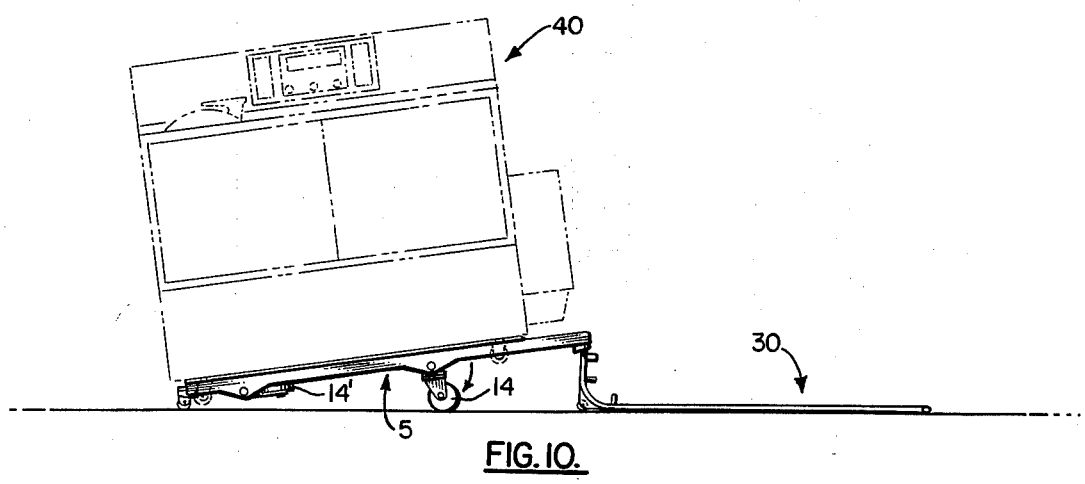
Figure 11:
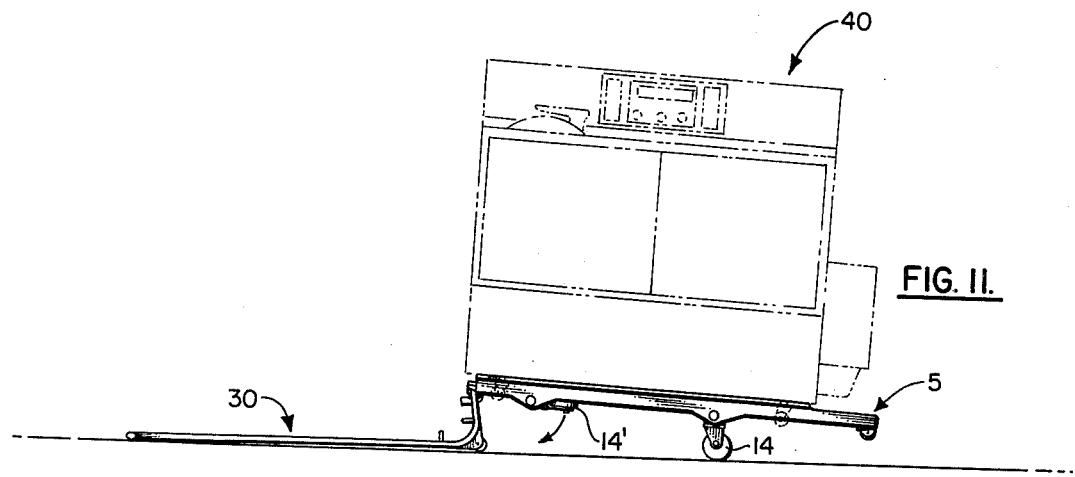

Sled 5 is slid into position under machine 40 on its own small sled casters 10 (note FIG. 8). As shown in FIG. 9, lever arm assembly 30 is then positioned with its tips 33 under and into the sockets of slet 5 and then pulled downward toward and against the floor, thereby lifting up one end of the machine 40/sled 5 combination so as to enable drop-leaf casters 14 to be lowered from their inoperative position. Because the legs of the L of the lever arm assembly are bent in toward each other, having less than 90° between them, the machine 40 will remain in its raised position.

Once casters 14 are locked in their lowered, operative position, lever assembly 30 is removed thereby permitting one end of the machine 40/sled 5 combination to rest the casters 14 on.

Lever assembly 30 is then applied to the opposite end, thereby jacking up the machine 40/sled 5 combination (note FIG. 11) so as to permit the lowering and locking of drop-leaf casters 14' into their operative position. Lever arm assembly 30 is then removed thereby permitting the machine 40 to ride completely on the drop-leaf casters 14, 14' through sled 5 and is now ready for transportation (note FIG. 12).

After the machine is delivered to its destination, a similar, but reverse, method is used to remove the sled 5 from beneath machine 40, leaving it to ride on its convenience casters 41.

Figure 13:
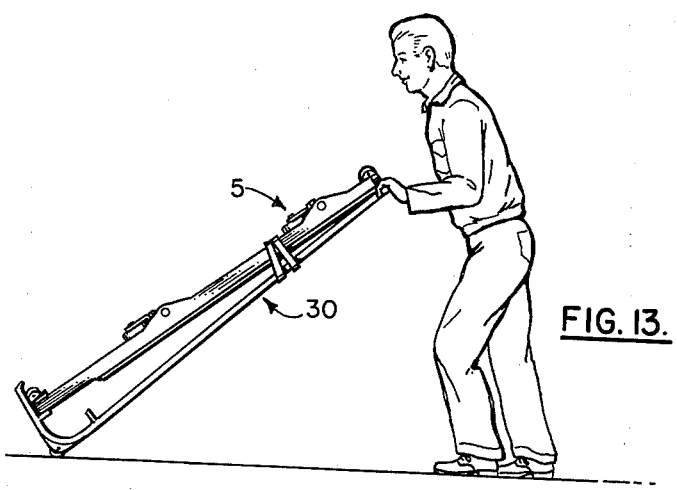
FIG. 13 is a side plan view of the various elements of the present system nested together for ease in transportation.

After the moving operation is completed, the sled 5 may then be nested or racked on lever arm assembly 30 and rolled by the user back to the moving van (note FIG. 13). The operation is thus completed and moving assembly of the present invention is ready for use for the next operation.

Nearly unlimited variations, alterations and changes in the design and detail of the preferred embodiment are possible within the scope of the present invention. In addition to those exemplary changes discussed in my prior copending application, there are of course many ways in which the integral caster sets 14, 14' can be mounted and attached to the sled 5. For example, rather than have the caster sets rotate down about a lateral, horizontal axis, they could be mounted for rotation down about a longitudinal, horizontal axis. Moreover rather than swinging the casters 14, 14' down freely, they could be mounted on a threaded axle and screwed up and down by rotating the threaded axle. Likewise many types of locking mechanisms besides the structure 15-17-18-20 illustrated or variations of the structure illustrated can be utilized to enhance the ease and use of the device, the number of possible variation being practically limitless. Additionally, two lever arm assemblies 30 could be used to simultaneously raise both ends of the sled 5 and simultaneously lower both sets of casters 14, 14', if desired.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. The method of providing a heavy load, supported on a surface by peripheral support members and having a substantial, intermediate portion of its bottom area offset a relatively small height from the surface on which it rests, with means for easy locomotion comprising the following steps:

provling a sled having a relatively small height with an upper load-bearing surface and at least two sets of vertically movable, intregal, heavy-duty carriage members carrying heavy-load-bearing wheels, at least one set of said carriage members and wheels during use of the sled being always located completely below said load-bearing surface and within the lateral sides of said sled and between said lateral support members, in a raised, inoperative position, and jacking means structurally separate from said sled;

sliding the sled with said sets of carriage members and wheels in their raised, inoperative position with said one set always located below said load-bearing surface and the offset bottom area of the load and between the lateral support members of the load into position beneath the offset bottom area of the heavy load, in juxtaposition thereto;

jacking up a first end of said sled with said separate jacking means so that said load rests in part on said first end;

lowering a first set of said carriage members into a lowered, operative position;

jacking up a second end of said sled with suitable jacking means so that the load is now fully carried by said sled;

lowering a second set of said carriage members into a lowered, operative position; and removing said jacking means so that the heavy load now rests on the wheels of said carriage members through said sled and is free to roll thereon.

2. The method of claim 1 wherein:
said first and second sets of carriage members are drop-leaf casters and are rotatably mounted on said sled, having raised, inoperative and lowered, operative positions at a 90° angle with respect to each other, and the method steps of lowering said carriage members comprise rotating said drop-leaf casters ninety degrees from their inoperative to their operative position.

3. The method of claim 2 wherein the radial plane of said wheels is parallel to the plane of said upper load-bearing surface when in its raised, inoperative position and is perpendicular thereto when in its lowered, operative position.

4. The method of claim 1 wherein:
the jacking means are the same means in jacking up both the first end and the second end of said sled, the method further including the steps of removing the jacking means from said first end after lowering said first set of carriage members and using the same jacking means to jack up the second end of said sled.

5. The method of claim 4 wherein said jacking means comprises a first-order lever, and wherein said jacking is performed by sequentially inserting said first-order lever under each end of the sled and raising it up.

6. The method of claim 1 wherein at least some of said carriage members are capable of 360° rotation when in supporting use; and wherein, in the final removal step, said heavy load resting on said carriage members is free to roll thereon in any direction.

7. The method of claim 1 wherein at least said load-bearing wheels which are always located below said load-bearing surface on said sled are located inboard from the ends of said sled when in their raised, inoperative position, and wherein, in sliding said sled into position beneath the load, said load-bearing wheels do not add to the height or length of said sled.

8. The method of claim 1 wherein said support members are legs upon which the load stands and said sled includes stop means projecting laterally out from its sides, and wherein, in sliding said sled into position beneath the offset bottom area of the load, said stop means hits the legs of the load, preventing said sled from being slid too far under the equipment.

9. The method of claim 8 wherein said sled includes skirt means projecting laterally from its sides defining a width just short of the distance between the legs of the load, and wherein, in sliding said sled into position, said skirt means aligns and guides said sled by slidingly contacting said legs as the sled is slid under the load.

* * * * *